United States Patent
Kumaki et al.

(10) Patent No.: US 8,064,346 B2
(45) Date of Patent: Nov. 22, 2011

(54) COMMUNICATION PATH CONTROL SYSTEM, PROGRAM, AND STORAGE MEDIUM THEREFOR

(75) Inventors: Kenji Kumaki, Fujimino (JP); Teruyuki Hasegawa, Fujimino (JP)

(73) Assignee: KDDI Corporation, Tokyo (JP)

( * ) Notice: Subject to any disclaimer, the term of this patent is extended or adjusted under 35 U.S.C. 154(b) by 118 days.

(21) Appl. No.: 12/513,231

(22) PCT Filed: Mar. 18, 2008

(86) PCT No.: PCT/JP2008/054961
§ 371 (c)(1),
(2), (4) Date: May 1, 2009

(87) PCT Pub. No.: WO2008/123063
PCT Pub. Date: Oct. 16, 2008

(65) Prior Publication Data
US 2010/0067532 A1    Mar. 18, 2010

(30) Foreign Application Priority Data
Mar. 27, 2007    (JP) .................................. 2007-080406

(51) Int. Cl.
*G01R 31/08* (2006.01)
(52) U.S. Cl. ........................................ 370/237; 370/238
(58) Field of Classification Search ........................ None
See application file for complete search history.

(56) References Cited

U.S. PATENT DOCUMENTS

| | | | |
|---|---|---|---|
| 6,697,333 B1 * | 2/2004 | Bawa et al. ................... 370/238 |
| 6,956,821 B2 * | 10/2005 | Szviatovszki et al. ........ 370/237 |
| 7,221,646 B2 * | 5/2007 | Kawano et al. ............... 370/218 |
| 7,450,513 B2 * | 11/2008 | Okamura et al. ............. 370/235 |
| 7,596,088 B2 * | 9/2009 | Agmon et al. ................ 370/230 |
| 7,725,035 B2 * | 5/2010 | Tyan et al. .................... 398/115 |

(Continued)

FOREIGN PATENT DOCUMENTS

EP    1411687 A2    4/2004

(Continued)

OTHER PUBLICATIONS

International Search Report, PCT Appln. No. PCT/JP08/54961, Jun. 17, 2008.

(Continued)

*Primary Examiner* — Michael J Moore, Jr.
(74) *Attorney, Agent, or Firm* — Morgan, Lewis & Bockius LLP (57) ABSTRACT

A communication path control system includes a storage device which stores data of paths between communication nodes; and a communication path selecting device which selects a path candidate for setting a new communication path among path candidates, each of which can be provided as a communication path between the communication nodes. Based on the data of paths, the communication path selecting device obtains MAX(PN) for each of the path candidates $P_1, \ldots, P_n$, n being an integer of 2 or larger, where MAX(PN) is the maximum value of the number PN of already-established communication paths passing through each link which forms said each path candidate, that is, $PN=[N_1, \ldots, N_m]$, is an integer of 1 or larger, and N is the number of the already-established communication paths passing through said each link; and the communication path selecting device selects the path candidate having the smallest value among the maximum values MAX(PN) of the path candidates.

4 Claims, 7 Drawing Sheets

U.S. PATENT DOCUMENTS

| | | | |
|---|---|---|---|
| 7,804,952 B2 * | 9/2010 | Chandra et al. | 379/221.01 |
| 7,885,398 B2 * | 2/2011 | Chandra et al. | 379/221.01 |
| 2005/0169313 A1 | 8/2005 | Okamura et al. | |
| 2005/0259586 A1 * | 11/2005 | Hafid et al. | 370/241 |

FOREIGN PATENT DOCUMENTS

| | | |
|---|---|---|
| JP | 2001-244974 A | 9/2001 |
| JP | 2003-224585 A | 8/2003 |
| JP | 2004-129135 A | 4/2004 |
| JP | 2005-217838 A | 8/2005 |

OTHER PUBLICATIONS

Rosen, et al., Multiprotocol Label Switching Architecture, Jan. 2001, pp. 1-61, The Internet Society.

Awduche, et al., RSVP-TE: Extensions to RSVP for LSP Tunnels, Dec. 2001, pp. 1-61, The Internet Society.

Moy, OSPF Version 2, Apr. 1998, pp. 1-244. The Internet Society.

How CSPF Selects a Path, 1998, pp. 1-1, Juniper Networks, Inc.

E. Osborne, et al., Traffic Engineering with MPLS, Cisco Systems, Jul. 2002, pp. 119-124, Cisco Press, Indianapolis, IN.

Katz, et al., Traffic Engineering (TE) Extensions to OSPF Version 2, Sep. 2003, pp. 1-14, The Internet Society.

Vasseur, et al., A Link-Type sub-TLV to Convey the Number of Traffic Engineering Label Switch Paths Signalled Across a Link draft-ietf-mpls-number-0-bw-te-lsps-01, May 24, 2006, pp. 1-7, The Internet Society.

* cited by examiner

COMMUNICATION PATH CONTROL SYSTEM, PROGRAM, AND STORAGE MEDIUM THEREFOR

TECHNICAL FIELD

The present invention relates to a communication path control system for controlling communication paths between communication nodes, and also relates to a program for making a computer function as the relevant communication path control system, and a storage medium which stores the program.

Priority is claimed on Japanese Patent Application No. 2007-080406, filed Mar. 27, 2007, the contents of which are incorporated herein by reference.

BACKGROUND ART

In a network (called an "MPLS network", below) which uses MPLS (multi protocol label switching) (see Non-Patent Document 1), an "MPLS TE" (traffic engineering) technique (see Non-Patent Document 2) is used for controlling a large amount of traffic.

In the MPLS TE technique, a plurality of parallel links are connected between nodes, so as to handle a large amount of traffic. In order to efficiently use the links, it is necessary to equally distribute "MPLS TE LSPs (label switched paths)" (called "MPLS paths", and see Non-Patent Document 2) for the frequency band and the number of the paths, where the MPLS paths are arranged along links provided between the start node (as the start point of the relevant communication) and the end node.

When setting MPLS paths by using reserved bands, it is possible to equally distribute the MPLS paths, which are arranged along links between the relevant nodes, by using already-established techniques (see Non-Patent Documents 2 and 6).

However, when setting MPLS paths while there is no reserved band at present, if there is an ECMP (equal cost multi path) (see Non-Patent Document 3) in an MPLS network, then load distribution cannot be performed between the relevant nodes. In this case, a problem (e.g., path concentration at a specific link) occurs, which obstructs efficient establishment of MPLS paths.

Conventionally, systems disclosed in Non-Patent Documents 4 and 5 are implemented.

In addition, computation of MPLS paths is performed at the start node, by using LSA (link state advertisement) data (see Non-Patent Documents 3 and 6) defined in OSPF (open shortest path fast) protocol (see Non-Patent Document 3).

On the other hand, in order to distribute MPLS paths along links between the relevant nodes, it is proposed that the number of the MPLS paths be communicated to relevant systems, by using the OSPF protocol (see Non-Patent Document 7). However, a specific method of computing the MPLS paths has not been shown.

Non-Patent Document 1: E. Rosen, A. Viswanathan, R. Callon, "Multiprotocol Label Switching Architecture", IETF RFC3031, January, 2001.

Non-Patent Document 2: D. Awduche, et al., "RSVP-TE: Extensions to RSVP for LSP Tunnels", IETF RFC3209, December, 2001.

Non-Patent Document 3: J. Moy, "OSPF version 2", IETF RFC2328, April, 1998.

Non-Patent Document 4: "How CSPF Selects a Path", retrieved from the Internet on Mar. 7, 2007.

Non-Patent Document 5: E. Osborne, A. Simha, "Traffic Engineering with MPLS", pp. 119-124, Cisco Press, 2003.

Non-Patent Document 6: D. Katz, et al., "Traffic Engineering (TE) Extensions to OSPF Version 2", IETF RFC 3630, September, 2003.

Non-Patent Document 7: J.-P. Vasseur, M. Mayer, K. Kumaki and A. Bonda, "A Link-Type sub-TLV to convey the number of Traffic Engineering Label Switch Paths signalled across a link", IETF Internet draft, June, 2006. (draft-ietf-mpls-number-0-bw-te-lsps-05.txt)

A conventional technique disclosed in Non-Patent Documents 4 and 5 has a problem, which will be explained with reference to a network shown in FIG. 7.

Figure 7:
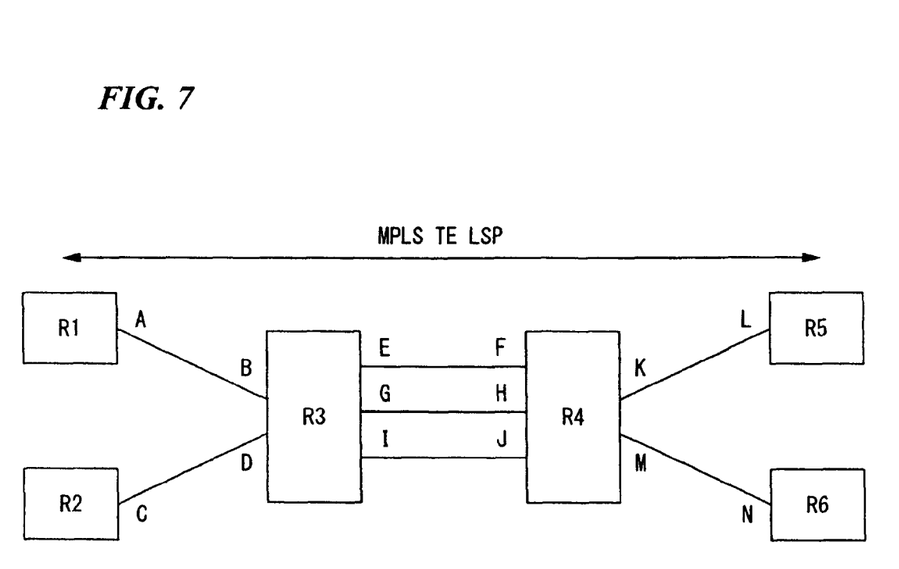
FIG. 7 is a diagram showing the structure of a network so as to explain a problem in conventional techniques.

In the network shown in FIG. 7, links E-F, G-H, and I-J are provided in parallel between core routers R3 and R4. In addition, a link A-B is provided between an edge router R1 and the core router R3; a link C-D is provided between an edge router R2 and the core router R3; a link K-L is provided between an edge router R5 and the core router R4; and a link M-N is provided between an edge router R6 and the core router R4.

In the conventional technique, when establishing a plurality of MPLS paths between the edge router R1 (the start node) and the edge router R5 (the end node), many paths are concentrated at the link E-F between the core routers R3 and R4, or paths are not equally distributed among the links E-F, G-H, and I-J.

Therefore, even when a plurality of links is established between the relevant nodes so as to control a large amount of traffic, paths are concentrated to a specific link, and thus the network works (i) without using the other links, or (ii) while usage rates of each link are not equal. Therefore, the links cannot be sufficiently efficiently used.

DISCLOSURE OF INVENTION

In consideration of the above problem, an object of the present invention is to provide a communication path control system, a relevant program, and a storage medium therefor, so as to equally distribute communication paths to a plurality of parallel links provided between communication nodes.

In order to solve the above problem, the present invention provides a communication path control system for controlling communication paths between communication nodes, comprising:

a storage device which stores data of paths between the communication nodes; and a communication path selecting device which selects a path candidate for setting a new communication path among path candidates, each of which can be provided as a communication path between the communication nodes, wherein:

based on the data of paths which is stored by the storage device, the communication path selecting device obtains MAX(PN) for each of the path candidates $P_1, \ldots, P_n$, n being an integer of 2 or larger, where MAX(PN) is the maximum value of the number PN of already-established communication paths passing through each link which forms said each path candidate, that is, PN=$[N_1, \ldots, N_m]$, m is an integer of 1 or larger, and N is the number of the already-established communication paths passing through said each link; and the communication path selecting device selects the path candidate having the smallest value among the maximum values MAX(PN) of the path candidates.

In a typical example:

if there is a plurality of the path candidates which have the smallest value among the maximum values MAX(PN), the communication path selecting device:

computes SUM(PN) for each of the relevant path candidates, where SUM(PN) is the sum of the number PN of the already-established MPLS paths passing each link which forms the path candidate, and selects the path candidate having the minimum value among the sums SUM(PN) of the relevant path candidates.

The present invention also provides a program for making a computer function as the above-described communication path control system.

The present invention also provides a computer readable storage medium which stores the above program.

In accordance with the present invention, it is possible to equally distribute communication paths to a plurality of parallel links provided between communication nodes.

BEST MODE FOR CARRYING OUT THE INVENTION

Below, an embodiment in accordance with the present invention will be explained with reference to the drawings.

Figure 1:
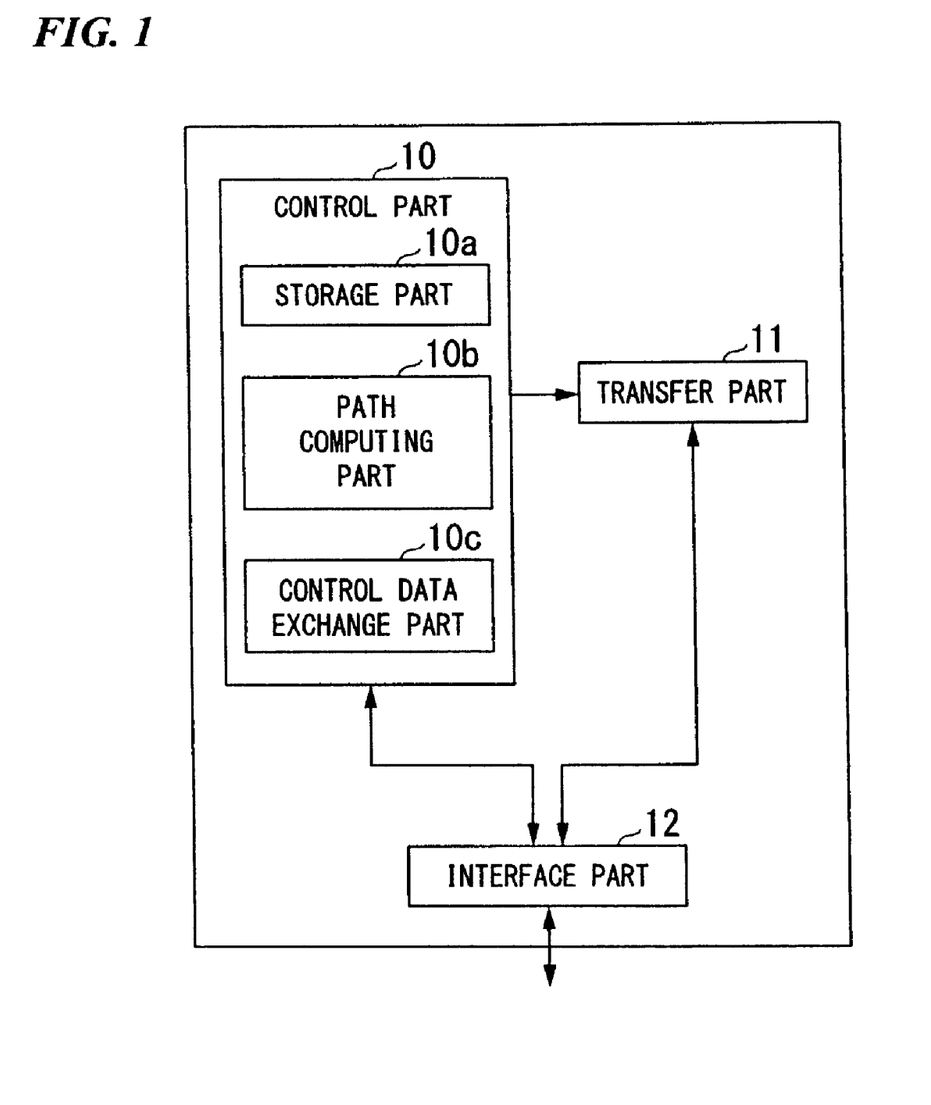
FIG. 1 is a diagram showing the structure of an MPLS path control system as an embodiment of the present invention.

FIG. 1 is a diagram showing the structure of an MPLS path control system as an embodiment of the present invention. The MPLS path control system is installed in a network apparatus (e.g., a router) on a network.

In FIG. 1, a control part 10 controls each part of the MPLS path control system, and has a storage part 10a and a path computing part 10b, which relate to execution of a computation of MPLS paths.

The storage part 10a stores data which is used in the MPLS path computation.

Based on the data stored in the storage part 10a, the path computing part 10b executes the MPLS path computation, so as to select a path candidate for setting a new communication path among path candidates, each of which can be provided as a communication path between the relevant communication nodes.

The control part 10 also has a control data exchange part 10c for exchanging control data with another MPLS path control system via an interface part 12.

In accordance with the MPLS paths determined by the control part 10, a transfer part 11 transfers data through the interface part 12, which is a physical communication interface connected to the relevant network.

The following explanation relates to a method for efficiently establishing MPLS paths by using no reserved band when there is an ECMP, and there are parallel links between nodes.

Figure 2:
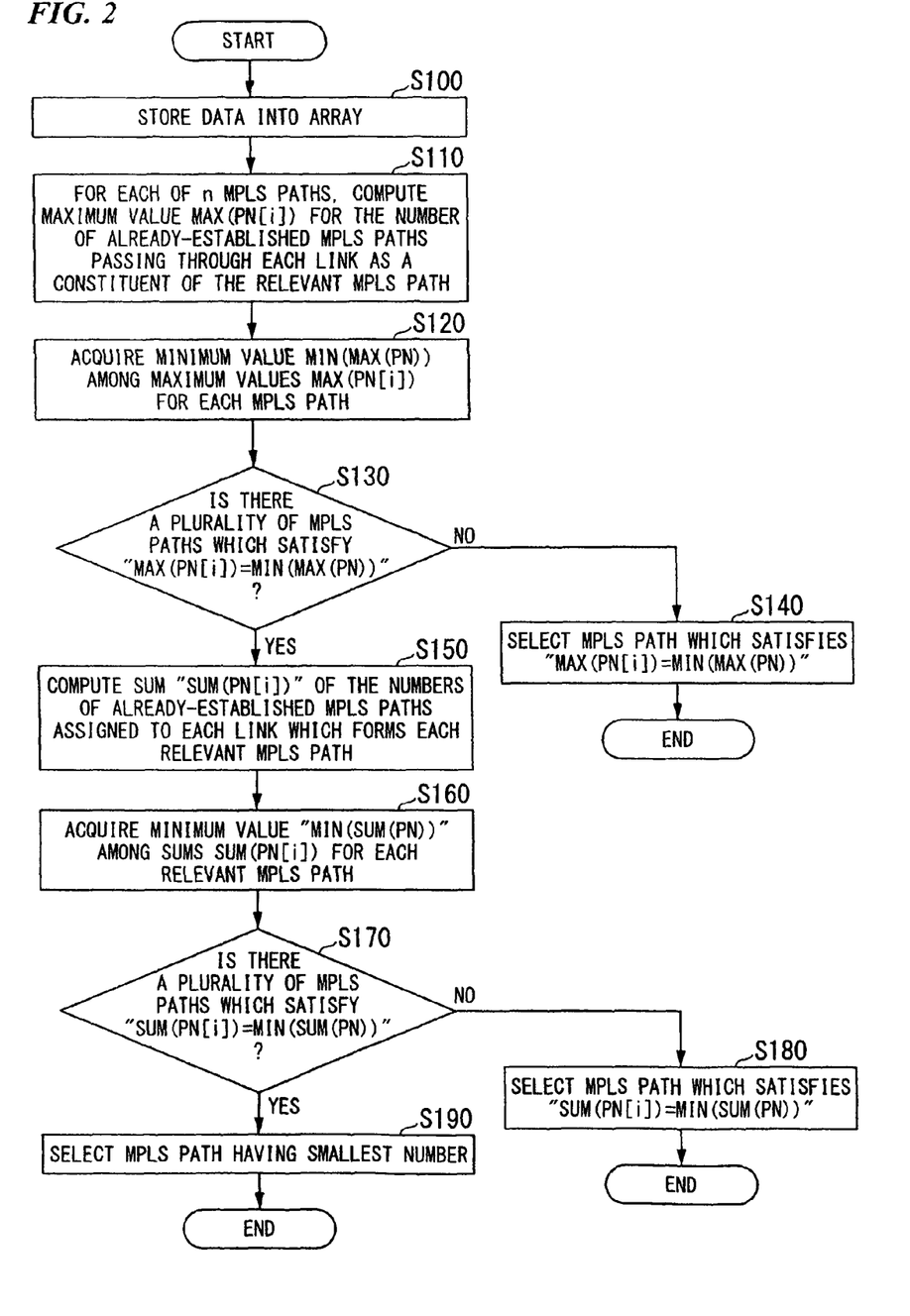
FIG. 2 is a flowchart showing the procedure of the MPLS path computation in the embodiment.

FIG. 2 is a flowchart showing the procedure of the MPLS path computation executed by the control part 10, and the following explanation appropriately refers to FIG. 2.

Before the execution of the MPLS path computation, the control data exchange part 10c of the control part 10 communicates OSPF protocol data (see Non-Patent Documents 6 and 7), so that a plurality of MPLS path control systems commonly have the same data. This data is stored by the storage part 10a, and includes data for indicating links between the relevant nodes on the network, and the number of already-established MPLS paths passing through each link.

Step S100 in FIG. 2

When the MPLS path computation starts, the path computing part 10b retrieves the above data from the storage part 10a, and lists up all ECMPs between the start node and the end node.

That is, if assuming that there are n ECMPs (n is an integer of 2 or larger), the path computing part 10b stores the MPLS path data, which is retrieved from the storage part 10a, into an array "ECMP" indicated by the following formula (1):

$$\text{ECMP}=[P[1], \ldots, P[n]] \quad (1)$$

The data of MPLS paths as candidates for an MPLS path which can be established between the relevant nodes is stored into P[i] (1≤i≤n) which forms the array "ECMP".

When a single MPLS path is formed by m links (m is an integer of 1 or larger), the array P[i] for the i-th MPLS path is represented by the following formula (2):

$$P[i]=[L_{i1}, \ldots, L_{im}] \quad (2)$$

In addition, the path computing part 10b stores data of the number of MPLS paths, which is retrieved from the storage part 10a, into an array "PN[i]" which indicates the number of already-established MPLS paths passing through each link as a constituent of the i-th MPLS path.

The array PN[i] is indicated by the following formula (3):

$$PN[i]=[N_{i1}, \ldots, N_{im}] \quad (3)$$

where $N_{ij}$ (1≤j≤m) indicates the number of already-established MPLS paths which pass through the j-th link.

Step S110 in FIG. 2

For all of the n MPLS paths, the path computing part 10b computes the maximum values MAX PN[i] for the number of the already-established MPLS paths, which is indicated by the formula (3) (see formula (4)).

$$\text{MAX}(PN[i])=\text{MAX}(N_{i1}, \ldots, N_{im}) \quad (4)$$

Next, the path computing part 10b stores the maximum value MAX(PN[i]) for each MPLS path into an array "MAX" represented by the following formula (5):

$$MAX = [MAX(PN[1]), \ldots, MAX(PN[m])] \quad (5)$$

Step S120 in FIG. 2

The path computing part 10b acquires the minimum value MIN(MAX(PN)) among the maximum values MAX(PN[i]) which form the array MAX (see formula (6)).

$$MIN(MAX(PN)) = MIN(MAX(PN[1]), \ldots, MAX(PN[n])) \quad (6)$$

Step S130 in FIG. 2

The path computing part 10b acquires each MPLS path which satisfies the condition "MAX(PN[i])=MIN(MAX(PN))", and determines whether a plurality of MPLS paths satisfies the above condition.

Step S140 in FIG. 2

If there is only one MPLS path which satisfies the above condition in accordance with the determination in step S130, the path computing part 10b selects the relevant MPLS path as the newly-established MPLS path.

Step S150 in FIG. 2

If there is a plurality of MPLS paths which satisfies the above condition in accordance with the determination in step S130, the path computing part 10b computes, for each MPLS path which satisfies the condition, the sum "SUM(PN[i])" of the numbers of the already-established MPLS paths assigned to each link which forms the relevant MPLS path (see formula (7)).

$$SUM(PN[i]) = N_{i1} + \ldots + N_{im} \quad (7)$$

The path computing part 10b then stores the sum SUM(PN[i]), acquired for each relevant MPLS path, into an array "SUM" represented by the following formula (8):

$$SUM = [SUM(PN[1]), \ldots, SUM(PN[m])] \quad (8)$$

Step S160 in FIG. 2

Next, the path computing part 10b acquires the minimum value "MIN(SUM(PN))" among the sums SUM(PN[i]) which form the array SUM (see formula (9)).

$$MIN(SUM(PN)) = MIN(SUM(PN[1]), \ldots, SUM(PN[n])) \quad (9)$$

Step S170 in FIG. 2

The path computing part 10b then acquires each MPLS path which satisfies the condition "SUM(PN[i])=MIN(SUM(PN))", and determines whether a plurality of MPLS paths satisfies the above condition.

Step S180 in FIG. 2

If there is only one MPLS path which satisfies the above condition in accordance with the determination in step S170, the path computing part 10b selects the relevant MPLS path as the newly-established MPLS path.

Step S190 in FIG. 2

If there is a plurality of MPLS paths which satisfies the above condition in accordance with the determination in step S170, the path computing part 10b selects the MPLS path having the smallest number (i) as the newly-established MPLS path.

When the newly-established MPLS path has been determined, the control part 10 retrieves the data of the relevant MPLS path from the array ECMP. Based on the retrieved data, the control part 10 executes path determination for the data transfer performed by the transfer part 11.

In addition, the control data exchange part 10c communicates the data of the newly-established MPLS path to the relevant systems.

Below, a concrete example of the path computation in accordance with the above procedure will be shown.

Figure 3:
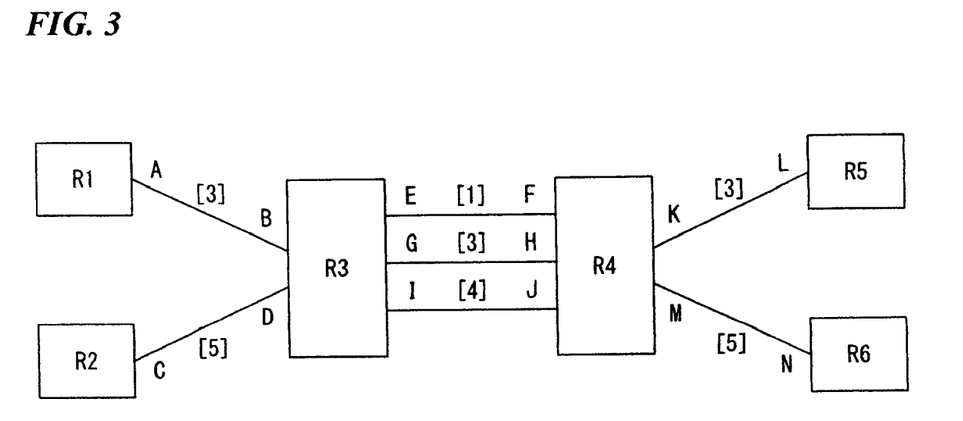
FIG. 3 is a diagram showing the structure of the network in the embodiment.

FIG. 3 is a diagram showing the structure of the network in the present embodiment. However, the structure of the network is not limited to that shown in FIG. 3, and can be appropriately modified.

In FIG. 3, each of core routers R3 and R4 and edge routers R1, R2, R5, and R6 has the MPLS path control system shown in FIG. 1.

In the network of FIG. 3, links E-F, G-H, and I-J are provided in parallel between the core routers R3 and R4. In addition, a link A-B is provided between an edge router R1 and the core router R3; a link C-D is provided between an edge router R2 and the core router R3; a link K-L is provided between an edge router R5 and the core router R4; and a link M-N is provided between an edge router R6 and the core router R4.

In the network shown in FIG. 3, a plurality of MPLS paths have already been established. In FIG. 3, each figure in parentheses "[ ]" indicates the number of already-established MPLS paths passing through the corresponding link.

That is, three MPLS paths pass through the link A-B. Similarly, five MPLS paths pass through the link C-D; one MPLS path passes through the link E-F; three MPLS paths pass through the link G-H; four MPLS paths pass through the link I-J; three MPLS paths pass through the link K-L; and five MPLS paths pass through the link M-N.

In order to establish a new MPLS path passing from the edge router R1 to the edge router R5, the MPLS path control system provided in the edge router R1 selects the new MPLS path, as follows:

The ECMPs from the edge router R1 to the edge router R5 are represented by the set of MPLS paths P1, P2, and P3 (see formula (10)).

$$ECMP = \{P1, P2, P3\} \quad (10)$$

In the formula (10), the MPLS paths P1, P2, and P3 are each represented by a set of links (see formulas (11) to (13), which correspond to the above-explained formula (2)).

$$P1 = \{A\text{-}B, E\text{-}F, K\text{-}L\} \quad (11)$$

$$P2 = \{A\text{-}B, G\text{-}H, K\text{-}L\} \quad (12)$$

$$P3 = \{A\text{-}B, I\text{-}J, K\text{-}L\} \quad (13)$$

In addition, for each MPLS path, the number (i.e., PN1, PN2, or PN3) of already-established MPLS paths passing through each link as a constituent of the relevant MPLS path is represented by the following formulas (14) to (16), which correspond to the above-explained formula (3)):

$$PN1 = \{3, 1, 3\} \quad (14)$$

$$PN2 = \{3, 3, 3\} \quad (15)$$

$$PN3 = \{3, 4, 3\} \quad (16)$$

The maximum values MAX(PN1), MAX(PN2), and MAX(PN3) of PN1, PN2, and PN3 are respectively represented by the following formulas (17) to (19), which correspond to the above-explained formula (4):

$$MAX(PN1) = 3 \quad (17)$$

$$MAX(PN2) = 3 \quad (18)$$

$$MAX(PN3) = 4 \quad (19)$$

The minimum value among MAX(PN1), MAX(PN2), and MAX(PN3) is 3, and there are two, that is, MAX(PN1) and MAX(PN2).

For each of the two MPLS paths, the sum of the numbers of the already-established MPLS paths passing through each link as a constituent of the relevant MPLS path is computed, and the result is 7 for the MPLS path P1, and 9 for the MPLS path P2.

Therefore, the MPLS path P1 passing through the link E-F between the edge routers R3 and R4 is selected as the newly-established MPLS path.

Similarly, in order to establish a new MPLS path from the edge router R2 to the edge router R6, an MPLS path passing through the link E-F between the core routers R3 and R4 is selected as the newly-established MPLS path.

Next, path computations performed by the MPLS path control system of the present embodiment will be compared with path computations performed by systems disclosed in Non-Patent Documents 4 and 5.

The network structure used for the computation is the same as that shown in FIG. 7. Computation was executed for the following three patterns, and comparison was performed:

Pattern 1: which has an initial state in which static paths are designated in advance so as to equally distribute MPLS paths to three links;

Pattern 2: which has an initial state in which static paths are designated in advance so as to equally distribute MPLS paths between two links; and Pattern 3: which has an initial state in which static paths are designated in advance so as to concentrate MPLS paths to a specific link.

For each pattern, the following three methods were used for performing the computation for establishing an MPLS path:

Method 1: in which the start node computes MPLS paths from the edge router R1 (start node) to the edge router R5 (end node), so as to establish the relevant path, where the path setting is performed using the system disclosed in Non-Patent Document 4;

Method 2: in which the start node computes MPLS paths from the edge router R1 (start node) to the edge router R5 (end node), so as to establish the relevant path, where the path setting is performed using the system disclosed in Non-Patent Document 5; and Method 3: in which the start node computes MPLS paths from the edge router R1 (start node) to the edge router R5 (end node), so as to establish the relevant path, where the path setting is performed using the MPLS path control system of the present embodiment.

Figure 4A:
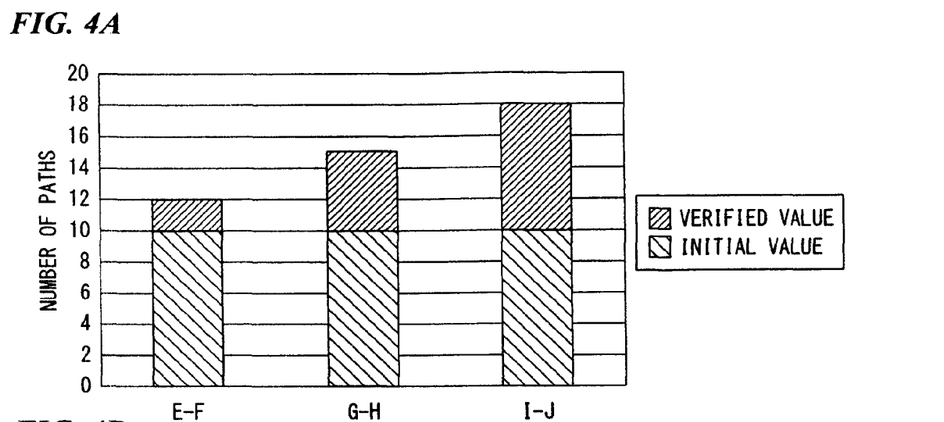
FIG. 4A is a diagram relating to a first comparative example between path computation results of the present embodiment and those of conventional techniques, and shows the results according to a conventional technique.
Figure 4B:
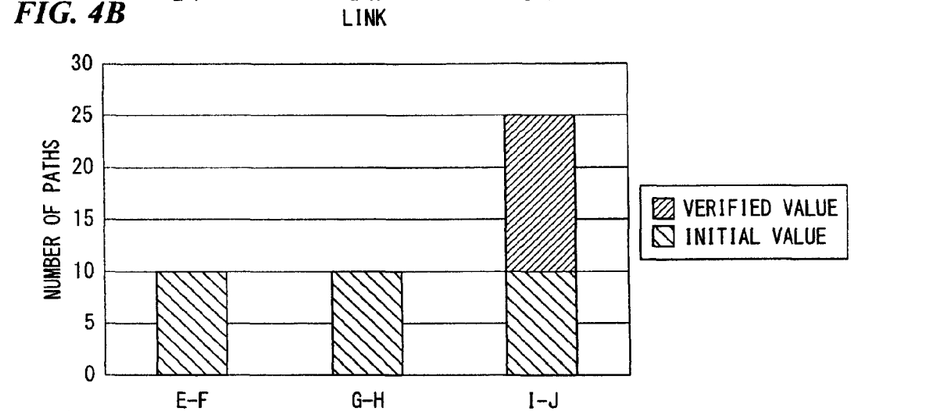
FIG. 4B shows the results according to another conventional technique in the first comparative example.
Figure 4C:
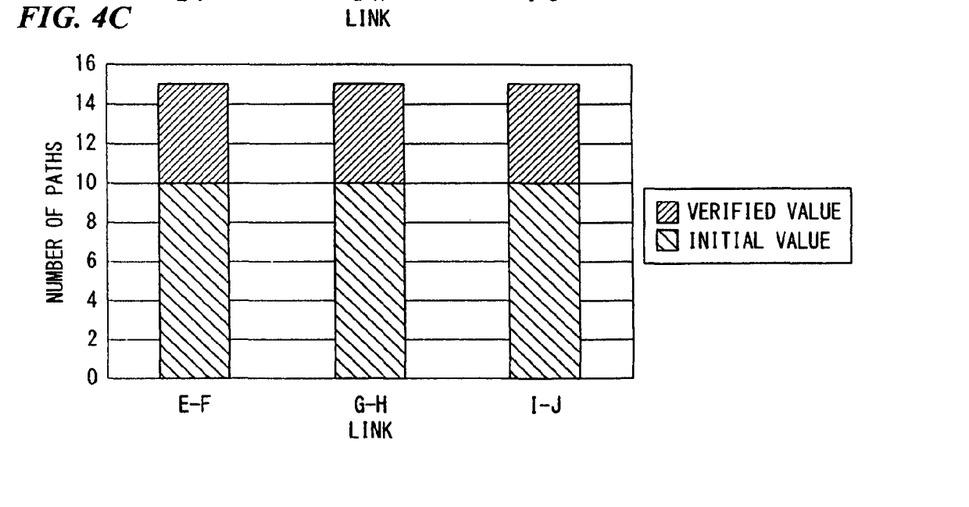
FIG. 4C shows the results according to the present embodiment in the first comparative example.

FIGS. 4A to 4C show the results of computations using Pattern 1.

FIG. 4A shows the results of a computation executed by the system disclosed in Non-Patent Document 4 (see the above "Method 1").

FIG. 4B shows the results of a computation executed by the system disclosed in Non-Patent Document 5 (see the above "Method 2").

FIG. 4C shows the results of a computation executed by the MPLS path control system in accordance with the present embodiment (see the above "Method 3").

Each figure shows the number of MPLS paths assigned to each of the links E-F, G-H, and I-J. In addition, the "initial value" indicates the number of already-established MPLS paths which are assigned to each link in an initial state before the computation is executed. The "verified value" indicates the number of MPLS paths which are newly established.

Figure 5A:
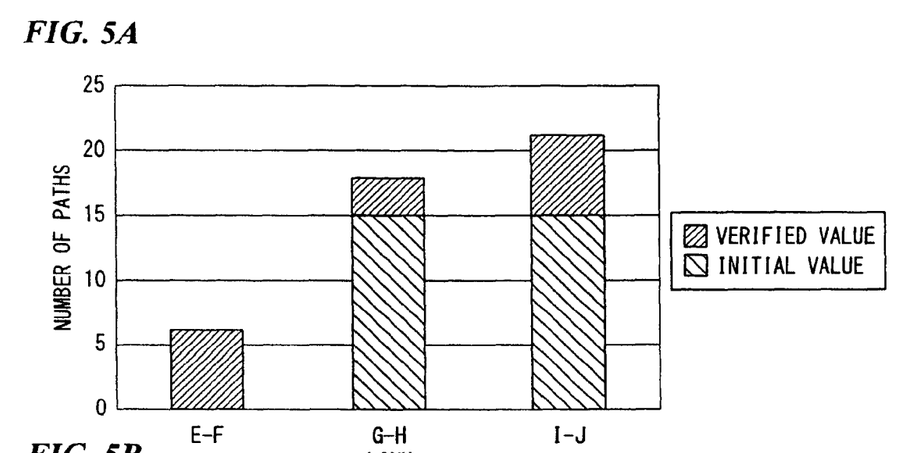
FIG. 5A is a diagram relating to a second comparative example between path computation results of the present embodiment and those of conventional techniques, and shows the results according to a conventional technique.
Figure 5B:
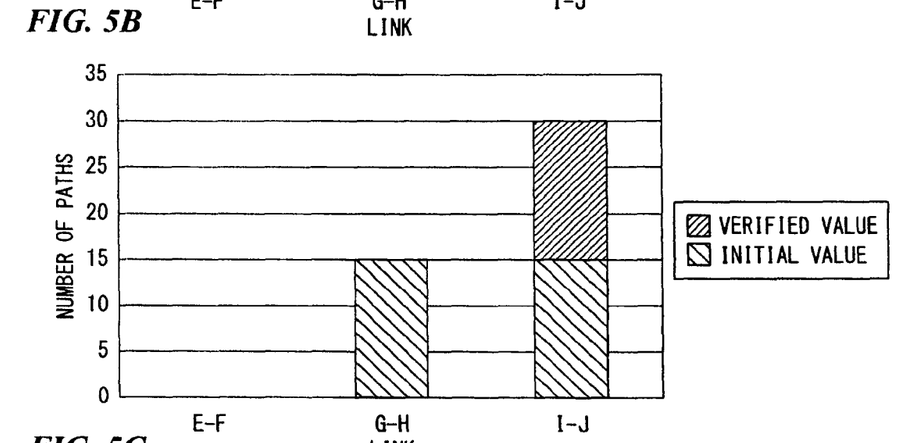
FIG. 5B shows the results according to another conventional technique in the second comparative example.
Figure 5C:
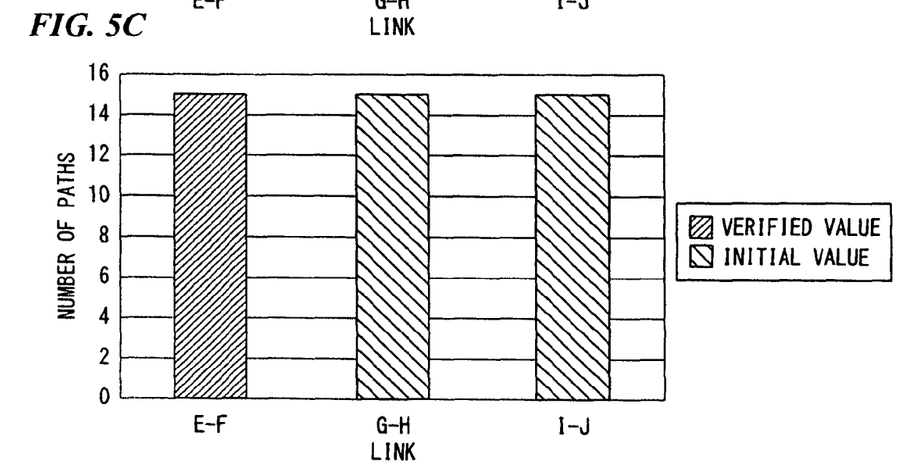
FIG. 5C shows the results according to the present embodiment in the second comparative example.

FIGS. 5A to 5C show the results of computations using Pattern 2.

FIG. 5A shows the results of a computation executed by the system disclosed in Non-Patent Document 4.

FIG. 5B shows the results of a computation executed by the system disclosed in Non-Patent Document 5.

FIG. 5C shows the results of a computation executed by the MPLS path control system in accordance with the present embodiment.

Figure 6A:
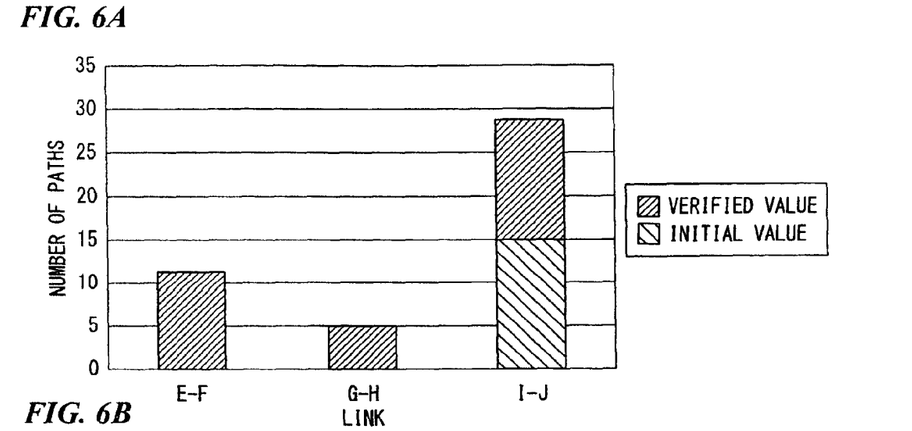
FIG. 6A is a diagram relating to a third comparative example between path computation results of the present embodiment and those of conventional techniques, and shows the results according to a conventional technique.
Figure 6B:
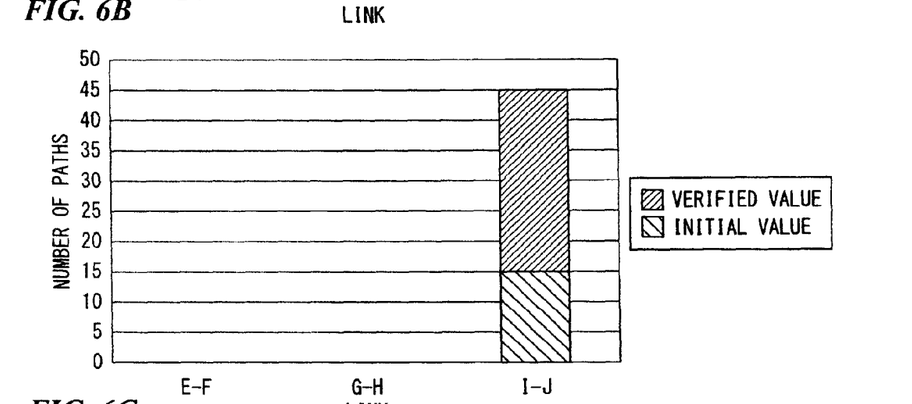
FIG. 6B shows the results according to another conventional technique in the third comparative example.
Figure 6C:
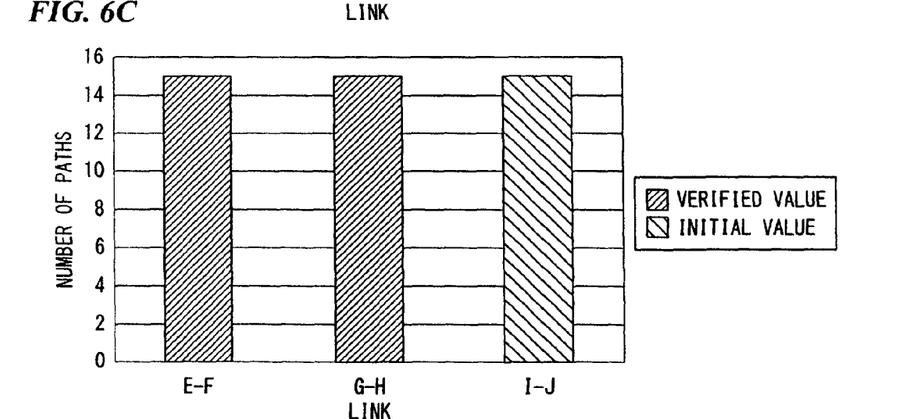
FIG. 6C shows the results according to the present embodiment in the third comparative example.

In addition, FIGS. 6A to 6C show the results of computations using Pattern 3.

FIG. 6A shows the results of a computation executed by the system disclosed in Non-Patent Document 4.

FIG. 6B shows the results of a computation executed by the system disclosed in Non-Patent Document 5.

FIG. 6C shows the results of a computation executed by the MPLS path control system in accordance with the present embodiment.

In the results of each computation executed by the system disclosed in Non-Patent Document 4 or 5, the MPLS paths are not equally assigned to the relevant links. In contrast, in the results of each computation executed by the MPLS path control system in accordance with the present embodiment, the MPLS paths are equally distributed for any settings of the MPLS paths in the initial state.

As described above, in accordance with the present embodiment, communication paths can be equally distributed to parallel-arranged links between communication nodes.

In addition, if a plurality of MPLS paths satisfies the relevant condition (see step S130 in FIG. 2), any MPLS path (which may have the smallest number) may be selected instead of performing step S150. Also in this case, the MPLS paths can be distributed to the parallel links to a certain degree. However, the MPLS paths can be more equally distributed when executing steps S150 to S190.

In accordance with the present embodiment, on the point of design and use of an actual network, it is possible to efficiently and effectively use network resources, and thus to provide an inexpensive and stable network service.

In contrast to conventional systems in which complex MPLS-path setting is manually performed, such complex MPLS-path setting can be avoided, thereby reducing the load and cost for using an actual network.

The embodiments of the present invention have been explained in detail with reference to the drawings. However, concrete structures are not limited to the embodiments, and also include design modifications or the like, within the scope of the present invention.

For example, a program for implementing the operations and functions of the MPLS path control system in accordance with the above-described embodiment may be stored in a computer readable storage medium, and the program stored in the storage medium may be loaded and executed on a computer.

If the computer employs a WWW system, the computer can provide a homepage viewable environment.

The above computer readable storage medium is a storage device, for example, a portable medium such as a flexible disk, magneto optical disk, ROM, or CD-ROM, or a memory device such as a hard disk built in a computer.

The computer readable storage medium also includes a device for temporarily storing the program, such as a volatile storage medium (RAM) in a computer system which functions as a server or client and receives the program via a network (e.g., the Internet) or a communication line (e.g., a telephone line).

The above program, stored in a memory device of a computer, may be transmitted via a transmission medium or by using transmitted waves passing through a transmission medium to another computer. The transmission medium for transmitting the program has a function of transmitting data, and is, for example, a (communication) network such as the Internet or a communication line such (e.g., a telephone line).

In addition, the program may execute a part of the above-explained functions.

The program may also be a "differential" program so that the above-described functions can be executed by a combination program of the differential program and an existing program which has already been stored in the relevant computer.

INDUSTRIAL APPLICABILITY

In accordance with the present invention, communication paths can be equally distributed to a plurality of parallel-arranged links between communication nodes.

The invention claimed is:

1. A communication path control system for controlling communication paths between communication nodes, comprising:
    a storage device which stores data of paths between the communication nodes; and
    a communication path selecting device which selects a path candidate for setting a new communication path among path candidates, each of which can be provided as a communication path between the communication nodes, wherein:
    based on the data of paths which is stored by the storage device, the communication path selecting device obtains MAX(PN) for each of the path candidates $P_1, \ldots, P_n$, n being an integer of 2 or larger, where MAX(PN) is the maximum value of the number PN of already-established communication paths passing through each link which forms said each path candidate, that is, PN= $[N_1, \ldots, N_m]$, m is an integer of 1 or larger, and N is the number of the already-established communication paths passing through said each link; and
    the communication path selecting device selects the path candidate having the smallest value among the maximum values MAX(PN) of the path candidates.

2. The communication path control system in accordance with claim 1, wherein
    if there is a plurality of the path candidates which have the smallest value among the maximum values MAX(PN), the communication path selecting device:
        computes SUM(PN) for each of the relevant path candidates, where SUM(PN) is the sum of the number PN of the already-established MPLS paths passing each link which forms the path candidate, and
        selects the path candidate having the minimum value among the sums SUM(PN) of the relevant path candidates.

3. A non-transitory computer readable storage medium which stores a computer-executable program for executing the communication path control system in accordance with claim 1 or 2.

4. The communication path control system in accordance with claim 1, wherein the already-established communication paths are equal cost multi paths (ECMPs) in a multi-protocol label switching (MPLS) network.

* * * * *